United States Patent [19]

Sheridan et al.

[11] Patent Number: 4,812,860

[45] Date of Patent: Mar. 14, 1989

[54] HEATER FOR IONOGRAPHIC MARKING HEAD ARRAY

[75] Inventors: Nicholas K. Sheridan, Saratoga; Richard G. Stearns, Mountain View, both of Calif.; John A. Frank; Brendan Casey, both of Webster, N.Y.; William Gary, Lyons, N.Y.

[73] Assignee: Xerox Corporation, Stamford, Conn.

[21] Appl. No.: 190,731

[22] Filed: May 4, 1988

[51] Int. Cl.[4] .............................................. G01D 15/00

[52] U.S. Cl. ...................................... 346/159; 346/155

[58] Field of Search ........... 346/155, 158, 159, 139 C; 400/119; 101/DIG. 13; 358/300; 250/423 R, 423 F

[56] References Cited

U.S. PATENT DOCUMENTS

| | | | |
|---|---|---|---|
| 3,413,654 | 7/1968 | Strong | 346/159 |
| 4,644,373 | 2/1982 | Sheridan et al. | 346/159 |

*Primary Examiner*—Arthur G. Evans
*Attorney, Agent, or Firm*—Serge Abend

[57] ABSTRACT

A heater for an ionographic marking apparatus including a housing, means for generating a supply of marking ions within the housing, means for transporting the marking ions through and out of the housing, and an array of modulation electrodes upon a substrate for controlling the transport of ions out of the housing, the modulation electrodes being spaced from one another by electrically insulating regions. The heater is associated with the array for raising the temperature of the electrically insulating regions so as to prevent the condensation of moisture thereon.

6 Claims, 5 Drawing Sheets

HEATER FOR IONOGRAPHIC MARKING HEAD ARRAY

FIELD OF THE INVENTION

This invention relates to an ionographic marking head array having a heater in proximity thereto for elevating the temperature of the modulation electrode region of the array so as to prevent the accumulation of moisture upon the substrate in the electrode region.

BACKGROUND OF THE INVENTION

Ionographic marking systems are disclosed in commonly assigned U.S. Pat. Nos. 4,584,522 and 4,719,481. In each, a fluid jet assisted ion projection marking device places imaging charges upon a moving receptor surface, such as paper, by means of a linear array of closely spaced minute air "nozzles". The charge, comprising ions of a single polarity (preferably positive), is generated in an ionization chamber, upstream of the "nozzles", by a high voltage corona discharge and is then transported to and through the "nozzles", where it is electrically controlled by electrical potentials applied to an array of marking elements, in the form of modulation electrodes, one associated with each "nozzle". Selective control of the electrical potential applied to each of the modulation electrode in the array will enable areas of charge and areas of absence of charge to be deposited on the receptor surface for subsequently being made visible by suitable development apparatus. A marking head of page width, i.e., about 8.5 inches wide, having a resolution of 200 to 400 spots per inch (spi) would result in an array of 1700 to 3400 modulation electrodes. Typically, for a 300 spi writing head, each of the modulating electrodes would be about 2.3 mils wide and have an interelectrode spacing of about 1 mil. The head array is divided into a number of sections of the modulation electrodes, arranged so that each section may be sequentially isolated and addressed by a compact, multiplexed, data loading circuit, integrated upon the head array substrate for bringing each of the modulation electrodes to the desired voltage (0 volts for "writing" or 10 to 30 volts for "non-writing"). Gray scale also may be achieved by imposing intermediate modulation voltage values on the modulating electrodes, for placing intermediate charge values upon the receptor surface which, when developed, exhibit a range of optical densities.

In U.S. Pat. No. 4,584,522 the modulation electrodes in each selected section are rapidly brought to the predetermined control voltage when coupled to data buses during a short segment of the entire line writing time. After being loaded each section is decoupled from the data buses and each modulation electrode will hold its applied voltage ("float") for the remainder of the line writing time. Typically, loading of each section can be accomplished in about 2.5% of the line writing time, allowing the modulation electrode to float for about 97.5% of the line writing time, until it is again addressed. The data loading circuit in U.S. Pat. No. 4,719,481 allows the modulation electrodes in each selected section to be directly connected to either a source of writing potential or a source of non-writing potential, each being supplied by a suitable bus line. In practice, the electrodes are held at either a reference (i.e. ground) potential, or a higher (15 to 30 volts) potential, respectively. While there are certain advantages to be derived from always maintaining the correct potential on the modulation electrodes, a disadvantage is that marking latitude is limited because it is not possible to apply a potential of any desired intermediate value as is necessary for gray scale marking.

In high humidity conditions, e.g., RH>50%, we have observed the occurrence of image blurring, or smearing, during operation of the marking device incorporating the head array of the U.S. Pat. No. 4,584,522 type. This has been attributed to interpixel current leakage. It was further observed during testing, that image blurring did not occur until after the marking head array had been exposed to corona effluents.

It is the primary object of this invention to provide an improved marking head array in which marking will be virtually unaffected by high humidity conditions.

It is another object of this invention to provide an improved marking head array which is heated for eliminating moisture collection upon its surface.

SUMMARY OF THE INVENTION

The present invention may be carried out, in one form, by providing an ionographic marking apparatus including a housing, means for generating a supply of marking ions within the housing, means for transporting the marking ions through and out of the housing, and means for controlling the transport of the ions out of the housing. The means for controlling comprises a substrate provided on one surface with an array of electrically conducting ion modulation electrodes spaced from one another by electrically insulating regions, and the improvement comprises heating means associated with the means for controlling for raising the temperature of the electrically insulating regions so as to prevent the condensation of moisture thereon.

BRIEF DESCRIPTION OF THE DRAWINGS

Other objects and further features and advantages of this invention will be apparent from the following, more particular, description considered together with the accompanying drawings, wherein.

DETAILED DESCRIPTION OF THE ILLUSTRATED EMBODIMENTS

Figure 1:
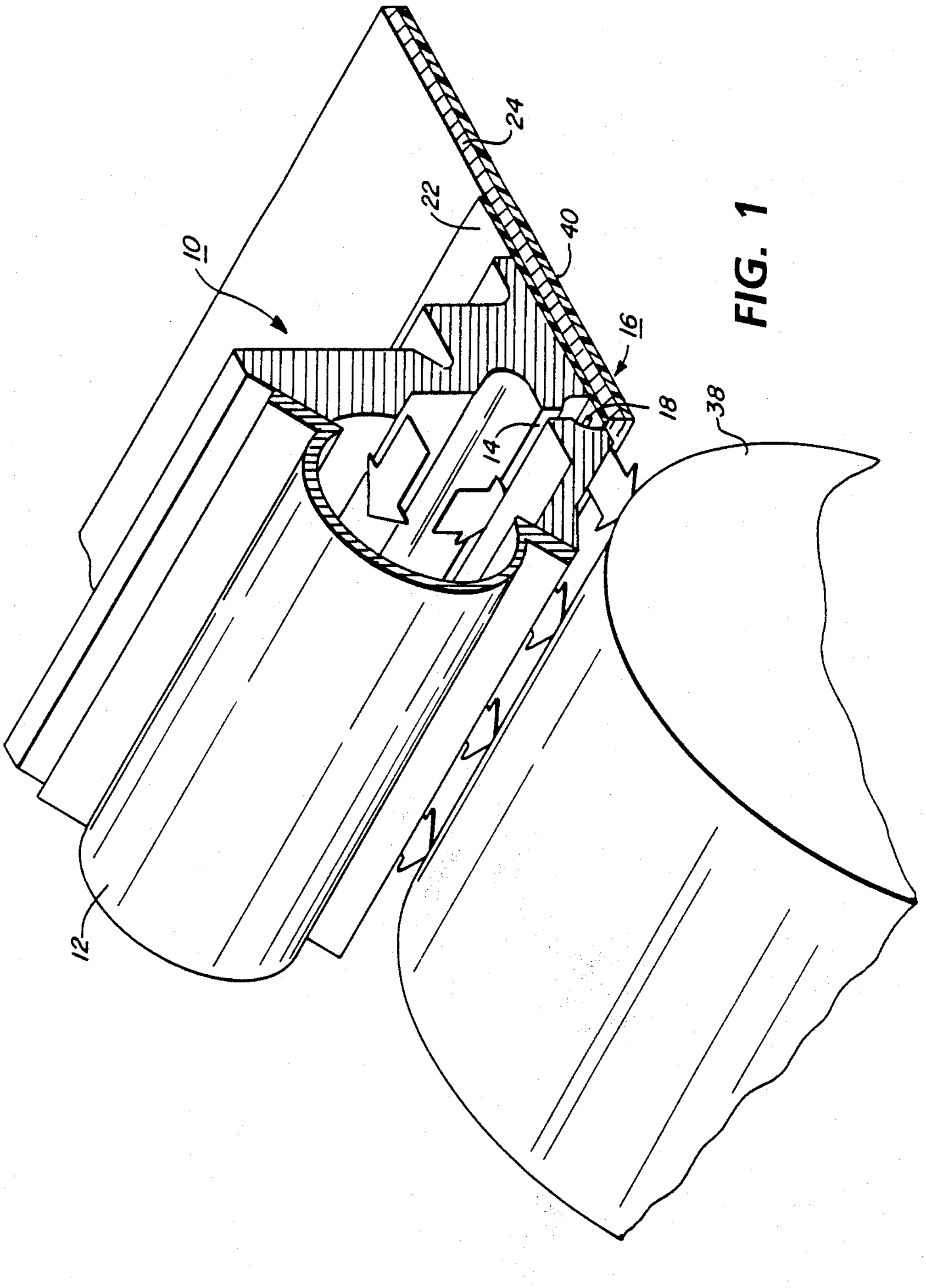
FIG. 1 is a perspective view showing an ionographic marking head.
Figure 2:
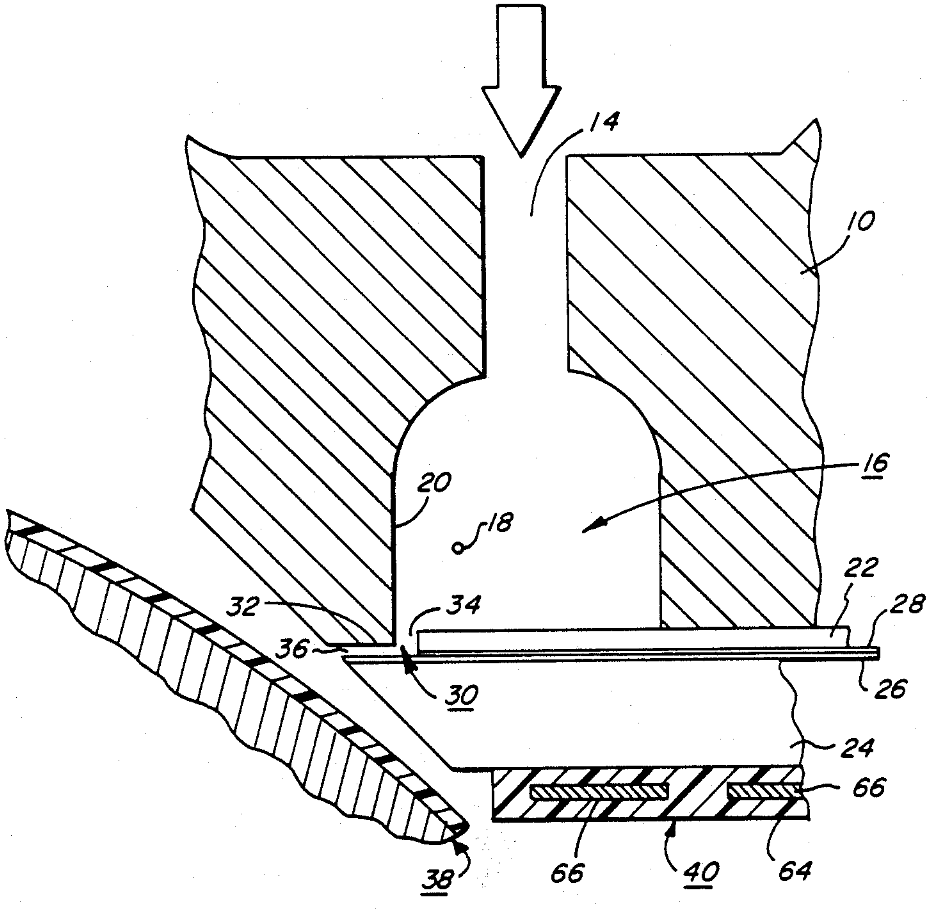
FIG. 2 is a side sectional view showing a portion of the marking head of FIG. 1.

With particular reference to the drawings, there is shown in FIG. 1 an ionographc marking head 10. The upper portion of the head defines a plenum chamber 12 to which is secured a source of transport fluid (not shown), such as air supplied by a blower. An entrance channel 14 delivers the air from the plenum chamber to an ion generation chamber 16, of generally U-shaped cross-section, having three side walls surounding a corona wire 18. All three of the walls of the ion generation chamber may be electrically conductive, although it is possible to make only the side wall 20 (the one closest to the wire) conductive and the remainder of the walls insulating. Thus, one has great latitude in fabricating the marking head 10; it may be made of a conductive material such as metal or a conductive plastic, or it may be made of an insulating material with certain significant portions coated with a conductive material. Suitable wire mounting supports (not shown) are provided at opposite sides of the marking head body for adjusting the mounting of the wire 18 to the desired location within the chamber 18. A plate 22, preferably made of conductive material, is urged against the marking head body to complete the chamber 16 by closing a major portion of the open end of the U-shaped cavity. As best seen in FIG. 2, the plate is spaced from side wall 20 to allow ions to exit the chamber.

A planar substrate 24, made of an insulating material, such as glass, supports the thin film electronic control elements and modulating electrodes of the marking array. The thin film elements are represented by the marking array layer 26 and are more specifically described with a reference to FIG. 3. An insulating layer 28 is sandwiched between the substrate 24 and conductive plate 22 to overcoat and protect the thin film electronic control elements and to electrically isolate them from the plate 22. A spring clip or other suitable biasing means (not shown) urges the substrate 24 and the plate 22 together and into place with sufficient force to flatten irregularities in each of these planar members, so as to define an accurately and uniformly configured dog leg exit channel 30 between the end of plate 22, the upper end surface of the substrate and the electrically conductive end wall 32 of the marking head is connected to a source of reference potential, such a ground. The generally L-shaped exit channel 30 includes an ion generation chamber exit region 34 and an ion modulation region 36. Thus, transport air flows through the head as represented by the arrows in FIG. 1: through the plenum chamber 12, into the ion generation cavity 16 via the entrance channel 14, out the exit channel 30, to impinge upon the receptor surface 38. A thin heater element 40 (to be described below) is secured to the bottom surface of the substrate 24.

Figure 3:
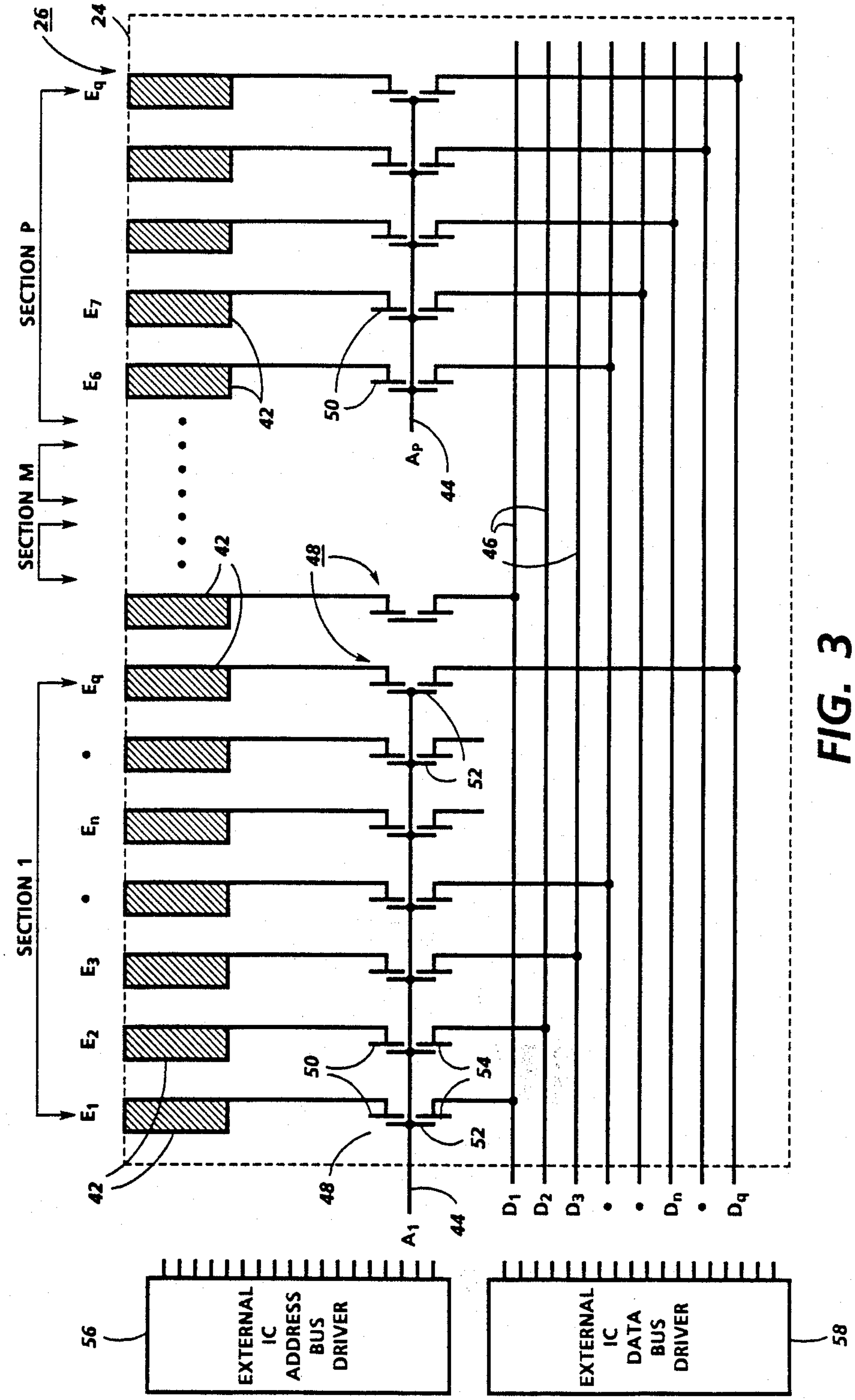
FIG. 3 is a schematic representation of a marking array including the control circuitry.

The marking array 26, of the present invention, illustrated in FIG. 3, may include, in its simplest form, an array of modulation electrtodes (E) 42, positioned along one edge of the substrate 24, and a multiplexed data entry or loading circuit, comprising a relatively small number of input address bus lines (A)44 and data bus lines (D)46, and thin film switches 48. As shown, each modulation electrode 42 is connected to the drain electrode 50 of a thin film transistor 48, an address bus line 44 is connected to its gate electrode 52, and a data bus line 46 is connected to its source electrode 54. The multiplexing arrangement comprises p sections or groups, each section having q electrode/switch pairs. In our present embodiment the 2560 pixel elements are divided into 40 sections (p=40) and 64 electrode/switch pairs (q=64). Each of the p address bus lines is addressed sequentially so as to address a selected section and each of the q data bus lines simultaneously brings the modulation electrodes of the selected section of the predetermined voltages. When an activating signal from the external IC address bus driver 56 is applied to the $A_{mth}$ address bus line, every one of the q thin film switches in the $m^{th}$ section is turned ON while the thin film switches of all other sections remain OFF. The q modulation electrodes 42 in the $m^{th}$ section will be charged or discharged to electrical potentials substantially equal to those supplied to the q data lines by the external IC data bus drivers 58. Then the thin film switches in the $m^{th}$ section will be turned OFF simultaneously and the thin film switches in the $(m+1)^{th}$ section will be turned on by pulsing the address bus line $A_{(m+1)}$. At the same time, new data will be supplied to and appear on the q data bus lines so that the modulation electrodes in the $(m+1)^{th}$ section will be charged or discharged to potentials corresponding to the new data on the data bus lines.

As described, loading of information is time multiplexed, i.e. the modulation electrodes in each section are loaded in about 2.5% of the line time, and then they act to control the ions passing through the exit channel 30 during the remaining about 97.5% of the line time. Since the thin film switches of each section are switched OFF after the modulation electrodes of a selected section have been charged to the predetermined data input voltages, each modulation electrode "floats" at, or near, its applied voltage until its associated switch is again turned ON for loading the next increment of line information.

Figure 4:
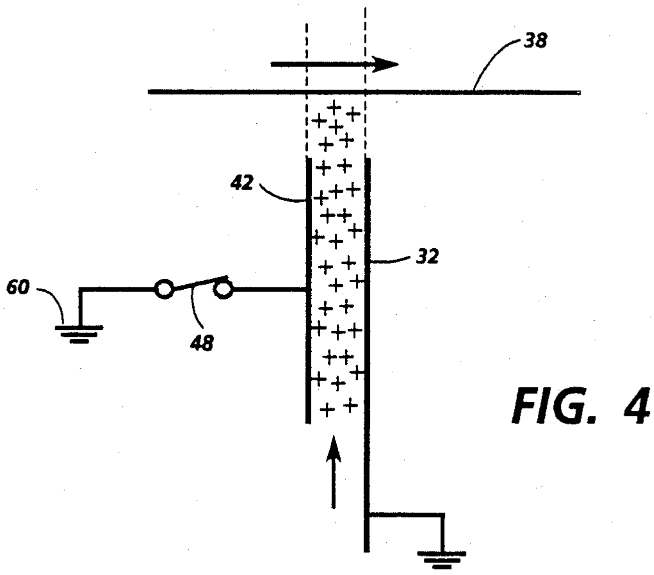
FIG. 4 is a schematic representation of a modulation structure showing "writing"
Figure 5:
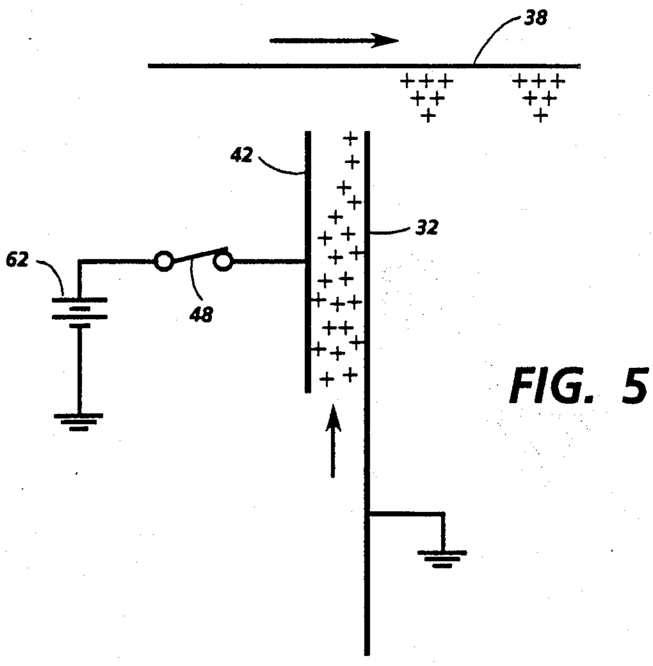
FIG. 5 is a schematic representation of a modulation structure showing "writing" being inhibited.

In FIGS. 4 and 5 there is illustrated the "writing" and "non-writing" conditions, respectively. Ions entrained in the transport fluid passing through the modulation region 36 come under the influence of fields established between the modulation electrodes 42 and the end wall 32. "Writing" of a selected spot (FIG. 4) is accomplished by connecting a modulation electrode 42 to the reference potential source 60, via switch 48, so that the ions, passing between the grounded modulation electrode and the grounded end wall, will not see a field therebetween and will pass to the receptor surface 38 where it will be made visible, subsequently. Conversely, when a modulation electric field is present between these elements, as by closing switch 48 and applying to the modulation electrode the desired potential from source 62, the established fields will repel ions to the grounded end wall. The ions driven into contact with the end wall 32 will recombine into uncharged, or neutral air molecules so that the transport fluid exiting from the modulation region 36 will carry no ions to the receptor surface. Since the potential source 62 may be selected to be any desired value, it is possible to deflect less than all of the ions passing through the ion modulation region, allowing only some ions to deposit on the receptor surface thus "writing" many desired levels of gray.

Figure 6:
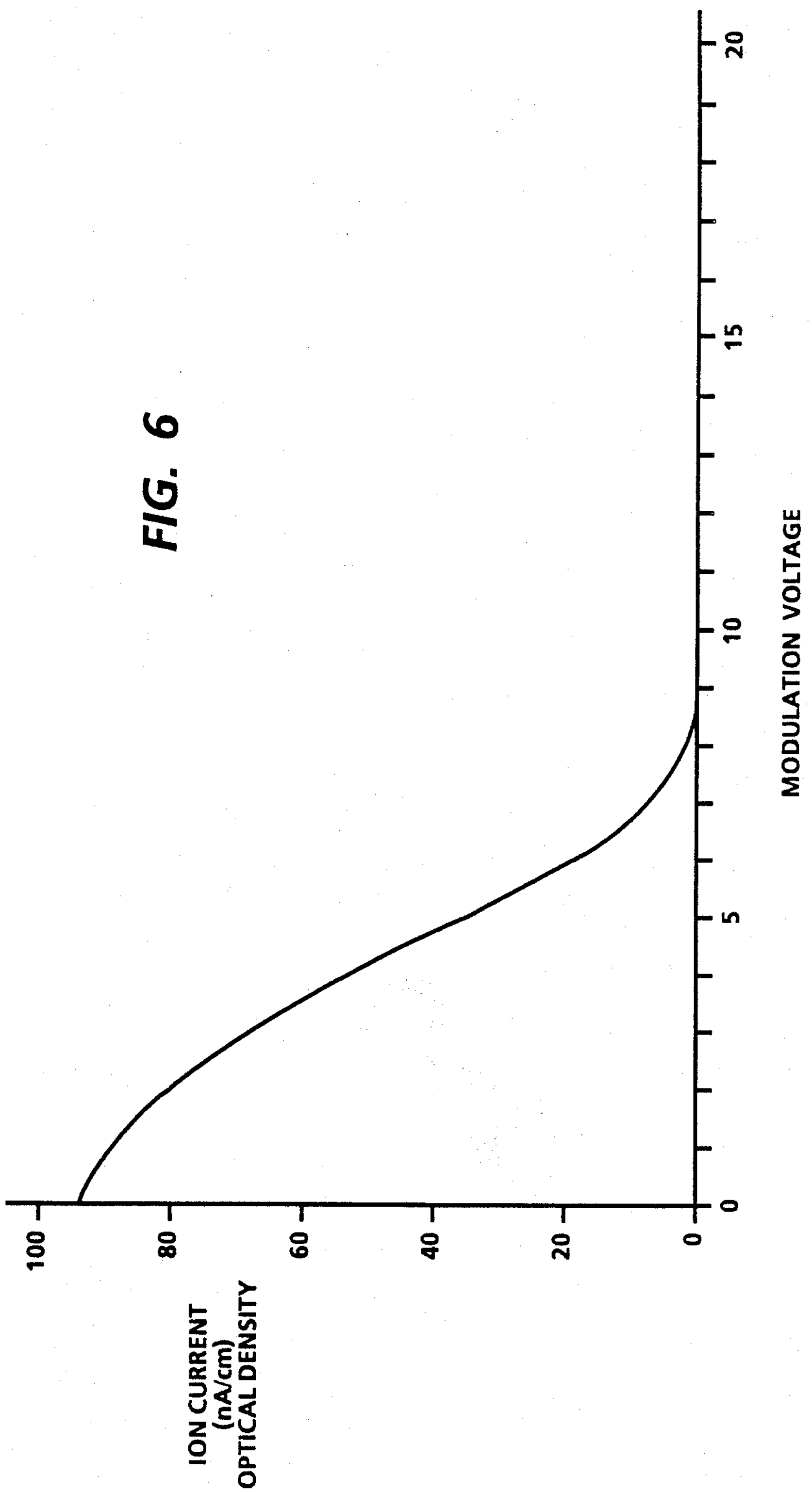
FIG. 6 is a plot of ion current and optical density as a function of modulation electrode voltage.

If the modulation electrodes are not held at the required voltage during binary "writing", the otherwise desirable feature of gray scale "writing" may become objectionable. This can be seen more clearly with reference to the characteristic curve illustrated in FIG. 6. The curve represents ion current (nA/cm) and optical density of a visible mark on the receptor surface, as a function of modulation voltage (the values for ion current are indicated on the Y-axis). Optical density (degree of black) of the image is effected by the development and transfer systems and is proportional to the ion current represented by the number of ions which have passed out of the marking head and have been deposited upon the receptor surface. For binary "writing" it is desirable to operate at the end portions of the curve (i.e. in the vicinity of 0 volts for "writing" and at about 8 volts, or greater, for "non-writing"). Black pixels will occur at modulation voltages at, or near, 0 to 2 volts, while white pixels will occur at modulation voltages at, or above, a threshold voltage of about 7 volts. Intermediate to these values, in the regions where the slope of the curve is the greatest, different levels of gray will be printed.

It has been observed that during operation of the ionographic marking device in high humidity conditions, e.g., R.H.>50% there is distortion of the desired ion output between electrodes "floating" at different modulation voltages. This phenomenon is attributed to interelectrode current leakage caused by a combination of the atmospheric conditions and the corona effluents. In the binary mode of operation, the result may be a fuzziness, rather than a crispness, at the edges of characters. In the gray scale mode of operation, humidity effects are even more disconcerting since it is critical, in order to achieve the proper optical density, that accurate voltage levels be applied. Any departure from the desired modulation voltage value will cause gray levels to be skewed.

During operation of a typical ionographic marking device, data voltages, on the order of 0 volts and 15 volts, are applied. On the higher voltage electrodes, it can be expected that the modulation electrodes will only achieve about 13 volts during the very short addressing time. However, if a conductive path exists between two adjacent electrodes charged to different potentials, the 13 volt electrode will lose a good deal of its charge to its neighbor over the remainder of the line time. For example, if about half the charge leaks off the higher voltage electrode and collects on the lower voltage electrode, both electrodes will reach equilibrium at about 6 volts. Then, as can be seen from FIG. 6, both electrodes will "write" gray, rather than the 0 volt electrode "writing" black and the 15 volt electrode "writing" white. As a result, the desired mark will be broadened and fuzzy. This same problem exists at the interface of black and white areas, wherein the crisp boundary becomes gray and fuzzy.

If, on the other and, the data voltage is on the order of 20 or 30 volts, and the same interelectrode current leakage conditions exist to an adjacent 0 volt electrode, it can be expected that both electrodes will reach equilibrium at about 10 to 15 volts. As can be seen from FIG. 6, both electrodes will "write" white, rather than the 0 volt electrode "writing" black and the higher voltage electrode "writing" white. In each case, the desired contrast between the output of the electrodes is lost, and image smearing takes place.

These printing aberrations are attributed to interpixel current leakage due to the establishment of a conductive path of water overlying the glassy interelectrode substrate surface. Normally, the head array contains hydrocarbon contamination upon its surface which makes adsorbed water bead on the interelectrode surfaces. Therefore, no continuous conductive paths are provided between the modulation electrodes. As presently understood, it is believed that the corona effluents provide a scrubbing action which cleans accumulated hydrocarbons off the array surface. It has been found that in addition to the ions created by the corona discharge, within the ion generation chamber 16, there is also ozone, and numerous oxides of nitrogen ($N_2O$, $NO_2$, NO), as well as the excited states of these gases, which are far more oxidizing than their non-activated states. In higher humidity conditions, where water is available, acids of nitrogen are also present. After the array surface has been cleaned by the highly reactive corona effluents, the wetting property of the interelectrode substrate surface is improved and the contact angle of the water condensed thereon approaches 0°. A thin and continuous layer of water will then provide conductive paths between the "floating" electrodes.

It has been found that one way to eliminate these conductive paths is to heat the marking array surface sufficiently to prevent condensation, or adsorption, thereon. Heating the array in the range of 100° F. to 130° F. provides a sufficient increase in temperature to compensate for the absolute moisture in an 80% to 85% relative humidity environment.

As shown in FIG. 2 the thin heater element 40 is secured to the underside of the planar substrate 24, as by adhesion, so as to obtain a good thermal coupling. The heater comprises a sandwich of polyimide (e.g. Kapton®) layers 64 enclosing resistive metal traces 66 which are connected to a suitable power supply. As implemented, a steady state power supply (of about 2.6 watts) has been found to be adequate to maintain the substrate at the proper temperature. In this configuration, the heater is always ON as long as the machine is plugged in, so that the machine is always ready to "write" and there is no need for energizing a moisture driving heater when the signal is given to "write", which would introduce a delay into the writing cycle. The constant wattage, always ON, combination minimizes cost by eliminating the need for any temperature control circuitry.

The conductive heater element may comprise a metal such as nichrome, in wire form or as a foil. Also suitable as heater element materials are tin oxide, indium oxide or mixtures thereof, or other metal oxides or conductive ceramics. Although the heater 40 is shown to be adhesively secured to the substrate, it is also possible to evaporate or paint thin films of heating material directly onto the substrate. Preferably, the heater material should have a high resistivity in thin film form, so that a reasonable voltage of about 12 to 15 volts, can be applied across it without generating a great deal of power. More recently a low watt density, self controlling, heater material has been developed whose conductivity decreases as it heats up, thus limiting itself to a desired, predetermined, temperature. Other heater choices, such as radiant or convective, may also be suitable.

It should be understood that the present disclosure has been made only by way of example, and that numerous changes in details of construction and the combination and arrangement of elements, may be resorted to, without departing from the true spirit and scope of the invention as hereinafter claimed.

What is claimed:

1. An ionographic marking apparatus including a housing, means for generating a supply of marking ions within said housing, means for transporting said marking ions through and out of said housing, and means for controlling the transport of said ions of said housing, said means for controlling comprising a substrate provided on one surface with an array of electrically conducting ion modulation electrodes spaced from one another by electrically insulating regions, the improvement comprising heating means associated with said means for controlling to raise the temperature of said electrically insulating regions so as to prevent the deposition of moisture thereon.

2. The ionographic marking apparatus as defined in claim 1 wherein said heating means is arranged to raise the temperature of said electrically insulating regions to the range of 100° F. to to 130° F.

3. The ionographic marking apparatus as defined in claim 1 or claim 2 wherein said heating means comprises a resistive heater secured to said substrate.

4. The ionographic marking apparatus as defined in claim 3 wherein said resistive heater is secured to the surface of said substrate opposite to said one surface.

5. The ionographic marking apparatus as defined in claim 3 wherein said resistive heater is continuously powered when the marking apparatus is in an ON condition.

6. The ionographic marking apparatus as defined in claim 3 wherein said resistive heater is intermittently powered through temperature control means for cycling a constant temperature.

* * * * *